United States Patent [19]

Dudynskyj

[11] 4,285,416
[45] Aug. 25, 1981

[54] WHEELCHAIR LIFT DEVICE

[75] Inventor: Peter P. Dudynskyj, Pontiac, Mich.

[73] Assignee: General Motors Corporation, Detroit, Mich.

[21] Appl. No.: 128,555

[22] Filed: Mar. 10, 1980

[51] Int. Cl.³ .............................................. B66B 9/20
[52] U.S. Cl. .................................. 187/9 R; 280/166; 414/921
[58] Field of Search .................. 187/9 R, 9 E, 10; 280/163, 166; 414/DIG. 921, 540, 480, 546; 105/447

[56] References Cited

U.S. PATENT DOCUMENTS

| 4,124,096 | 11/1978 | Dudynskyj et al. | 187/9 R |
| 4,124,097 | 11/1978 | Hawks et al. | 187/9 R |
| 4,124,098 | 11/1978 | Dudynskyj | 187/9 R |

OTHER PUBLICATIONS

Alden G. Olson; Apr. 1, 1974; Transit Technology; report by Abt. Associates entitled "Travel Barriers"; p. 1.

Primary Examiner—Robert J. Spar
Assistant Examiner—Kenneth Noland
Attorney, Agent, or Firm—Edward J. Biskup

[57] ABSTRACT

A wheelchair lift device located in the stepwell that includes foldable hinged members normally positioned through a linkage to form upper and lower steps with a riser therebetween, and rotatable outwardly relative to the stepwell during which time the steps are aligned along a horizontal plane to form a platform for supporting a wheelchair and the riser is tucked under the upper step.

4 Claims, 6 Drawing Figures

WHEELCHAIR LIFT DEVICE

This invention concerns a wheelchair lift device for vehicles such as buses, and more particularly, a wheelchair lift device which provides steps that can be converted into a flat horizontal platform for supporting a wheelchair.

One form of wheelchair lift device presently being used in buses can be seen in U.S. Pat. No. 4,124,097, issued on Nov. 7, 1978 in the names of Hawks et al. and assigned to the assignee of this invention. The wheelchair lift device seen in the Hawks et al. patent is located in a stepwell and includes a pair of hinged base or subframe sections which, together with pivotally interconnected and movable riser and step members, normally form a two-step stairway to allow able-bodied persons to board and exit the bus in the usual manner. When desired, however, the Hawks et al. device can be transformed into a substantially flat platform by deploying the subframe sections outwardly relative to the stepwell. During deployment, both the movable riser member and the movable step member fold downwardly into the associated subframe sections and, together with the latter, are positioned side by side to form the support surface of the platform which, afterwards, can be lowered to ground level to accommodate a person confined to a wheelchair.

The present invention is directed to a wheelchair lift device of the type described above but differs therefrom in that the movable riser member, rather than being located alongside of the movable step member and serving as a support surface when in the platform configuration, is moved rearwardly to a position beneath the movable step member. Stated broadly, this is realized by having the movable riser member pivotally supported in a pendulous fashion by the movable step member and connected to the guide linkage of the wheelchair lift device in a manner which assures that the movable riser member is located under the platform when the subframe sections are horizontally aligned while still allowing the movable riser member to cooperate with the movable step member to form one step of the two-step stairway when the subframe sections assume the step configuration.

The objects of the present invention are to provide a new and improved wheelchair lift device having a movable carriage which supports a plurality of hinged members that normally form upper and lower steps with a movable riser pivotally supported therebetween in a pendulous fashion, and in which the upper and lower steps are movable into a horizontal platform configuration for supporting a wheelchair while the movable riser is pivoted to a position beneath the platform; to provide a new and improved wheelchair lift device that can be located in the stepwell of a bus and that includes a pair of hinged subframe sections which support a pivotally interconnected step-and-riser combination that, together with the subframe sections, normally form upper and lower steps and upper and lower risers and are movable about a horizontal axis outwardly relative to the stepwell under the control of a pair of links to cause the upper and lower steps and the upper riser to form a flat platform for supporting a wheelchair with the lower riser positioned under the platform; to provide a new and improved wheelchair lift device for the stepwell of a bus that has a pair of link members for supporting a pair of step-forming hinged subframe sections, with one of the link members being connected to a riser member and serving to move the latter rearwardly under a step member when the device is deployed so as to form a flat horizontal platform for supporting a wheelchair; to provide a new and improved wheelchair lift device that can be located in the stepwell opening of a bus and has sections that are positioned through a linkage to form upper and lower steps with a riser therebetween, and in which the linkage operates during deployment to tuck the riser rearwardly and underneath the upper step to form a flat support platform for a wheelchair; and to provide a new and improved wheelchair lift device that includes a step-platform assembly having upper and lower steps and in which the upper step supports a riser that is relatively pivotable about the upper step and is freely suspended at its lower edge and moves rearwardly into a conforming position with the upper step when the step-platform assembly is moved from the step-forming position to a horizontal platform position.

In the preferred form, the above objects and others are accomplished by a wheelchair lift device which includes a swingable subframe section carried for rotation about a horizontal axis at its top edge and a horizontal subframe section carried for guided orbiting movement and hinged to the swingable subframe section at its bottom edge for relative movement about a horizontal axis. An upper step member is hingedly connected to the swingable subframe section intermediate the top and bottom edges, and the forward portion of the horizontal subframe section defines both a lower step portion and a platform portion. In addition, a lower riser member is hingedly connected to the outboard end of the upper step member, and the upper portion of the swingable subframe section defines an upper riser portion when in the step-forming position. The swingable subframe section, when in a pendulous vertical position, locates the lift device in a step configuration, and when moved to the horizontal position, locates the lift device in a platform configuration. A pair of links are provided at each side of the swingable and horizontal subframe sections for connecting the latter to a carriage which serves to lower the assembly after deployment of the platform. One of the links consists of a power-operated linearly extensible and contractible member while the other link is a rigid member with one end pivotally connected to the carriage and the other end connected to one of the subframe sections. The arrangement of the links and the subframe sections is such that when the power-operated link is contracted, the subframe sections rotate outwardly relative to the doorway and, together with the upper step member, form a horizontal platform located substantially in the plane of the vehicle floor. During such movement, one of the links serves to pivot the lower riser member rearwardly under the upper step member so that the lower riser member is located beneath the platform and allows the support surface of the upper step to be horizontally aligned with the support surfaces of the swingable and horizontal subframe sections. After the hinged subframe sections are deployed into a horizontal platform configuration, the carriage can then be moved from the raised position to the lowered position so as to place the platform at ground level.

A more complete understanding of my invention can be derived from the following detailed description taken in conjunction with the drawings, in which.

Figure 1:
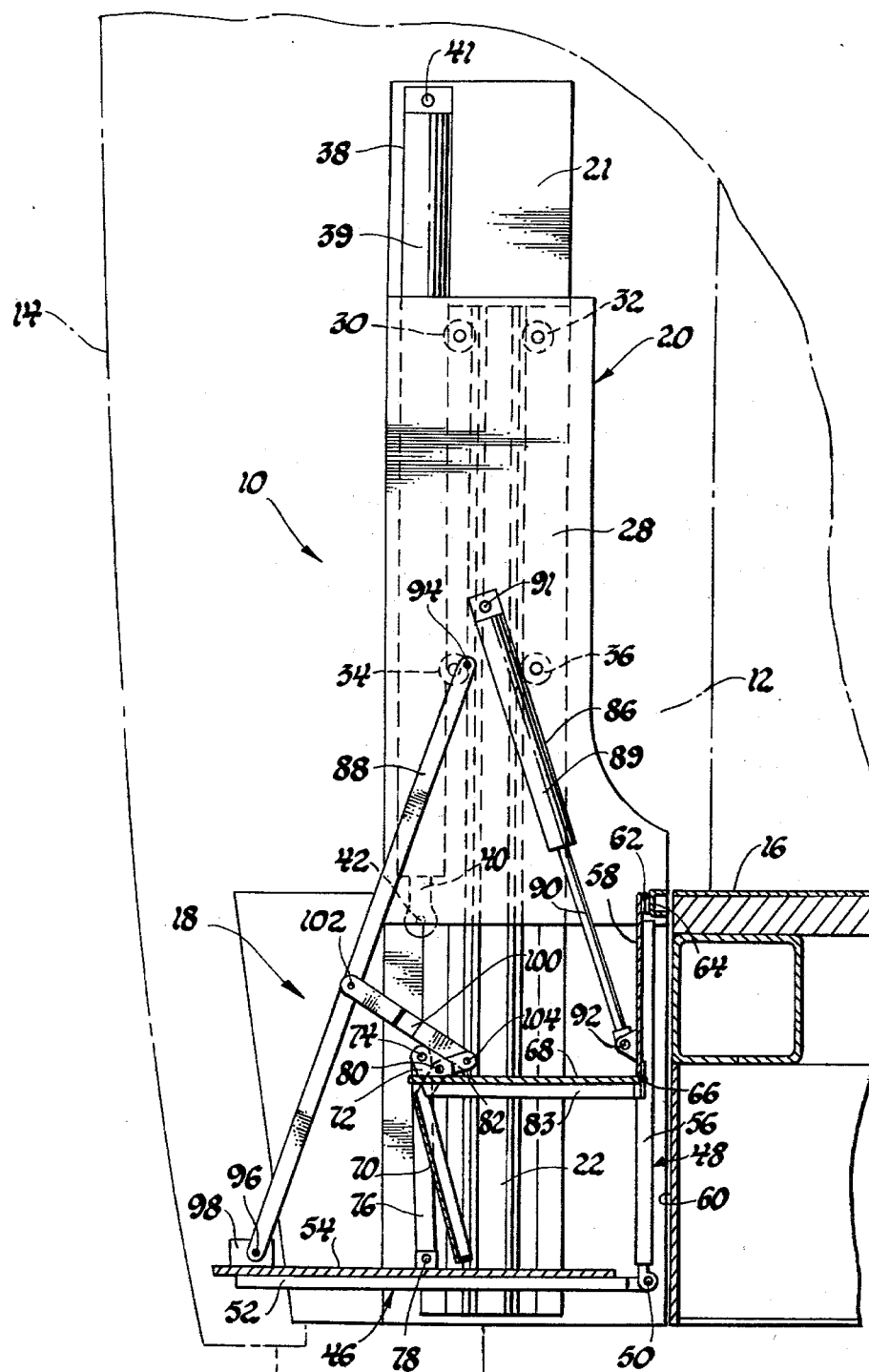
FIG. 1 is an elevational side view showing a wheelchair lift device made in accordance with the invention and located in the stepwell of a motorcoach and located in the step-forming position.
Figure 5:
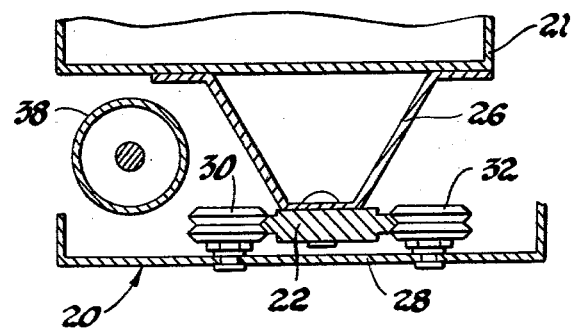
FIG. 5 is an enlarged sectional view of one of the support assemblies which forms a part of the wheelchair lift device, and is taken on line 5—5 of FIG. 3.
Figure 6:
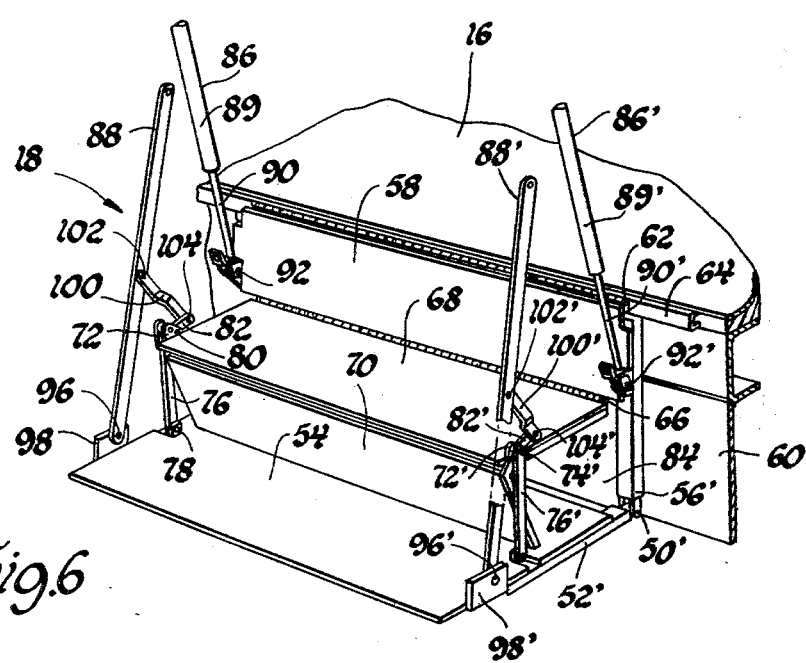
FIG. 6 is a perspective view of the step-platform assembly which forms a part of the wheelchair lift device seen in FIG. 1.

Referring to the drawings, and more particularly FIGS. 1, 5, and 6 thereof, a wheelchair lift device 10 made in accordance with the invention is shown positioned within the stepwell 12 of a motor vehicle 14, such as a coach or bus of the type used in mass public transit and having the usual floor 16 which is at an elevation substantially above ground level. As will be more apparent as the description of the invention proceeds, the wheelchair lift device 10 includes a step-platform assembly, generally indicated by reference numeral 18, that provides the usual two steps in the stepwell 12 of the motor vehicle 14 permitting normal boarding and exit for able-bodied passengers. In addition and when it is desired, the step-platform assembly 18 can be converted, through suitably arranged linkage to be described, into a horizontal platform for a wheelchair and, afterwards, can be moved between an aligned position with the vehicle floor 16 and a ground level position. In this manner, a physically handicapped person confined to a wheelchair can be served by the vehicle 14.

Figure 2:
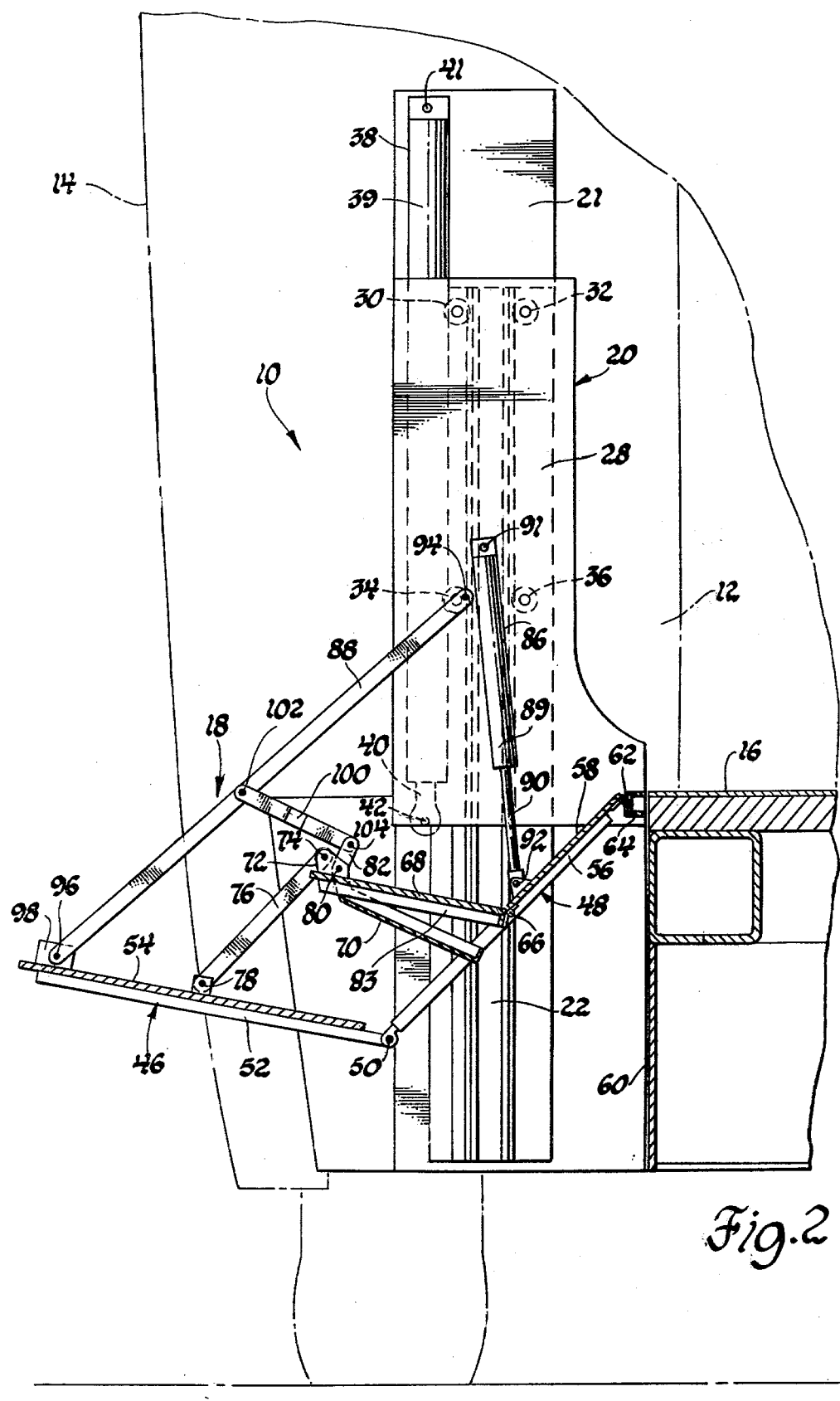
FIG. 2 is a view similar to FIG. 1 with the wheelchair lift device partially deployed outwardly relative to the stepwell.
Figure 3:
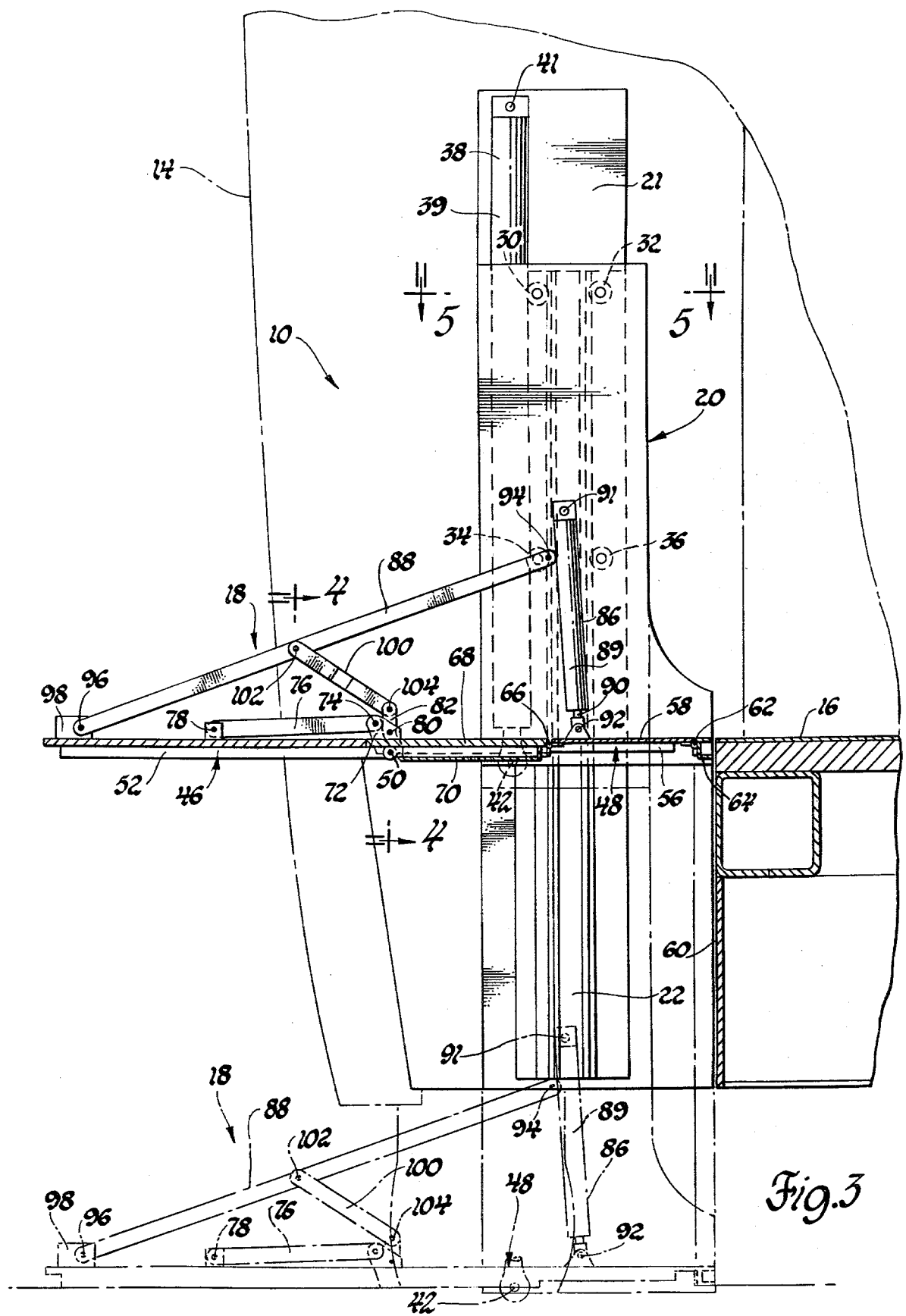
FIG. 3 is a view similar to FIG. 1 with the wheelchair lift device completely deployed and forming a horizontal platform in line with the floor of the motorcoach.

More specifically, the wheelchair lift device 10 includes a pair of support assemblies spaced along an axis parallel to the longitudinal axis of the vehicle 14 and located in the stepwell 12 of the vehicle 14. As seen in FIGS. 1–3 and for clarity purposes, only one of the support assemblies is shown and is identified by the reference numeral 20, it being understood that a similar support assembly is positioned on the opposite side of the stepwell 12 and is provided with corresponding and identical parts.

The support assembly 20 includes a plate member 21 secured in a vertical position to the associated frame structure of the vehicle 14; a vertically disposed guide-bar 22 secured to the plate member 21 through a generally V-shaped bracket 26, as seen in FIG. 5; and a carriage 28. The guide-bar 22 has the side edges thereof shaped in the form of a "V" when viewed in cross section in FIG. 5, and is adapted to support the carriage 28. In this connection, it will be noted that the carriage 28 includes an upper pair of horizontally aligned rollers 30 and 32 and a lower pair of horizontally aligned rollers 34 and 36 which engage and ride along the associated guide-bar 22. A double-acting hydraulic lift cylinder 38 is mounted to the plate member 21 and is connected to the carriage 28 for moving the latter between the full-line and phantom-line positions shown in FIG. 3. The hydraulic lift cylinder 38 includes a cylinder member 39 and a relatively movable piston member 40.

As seen in FIG. 1, the cylinder member 39 has its base-end connected to the plate member 21 by pivotal connection 41, while the rod-end of the piston member 40 is connected to the carriage 28 by a pivotal connection 42. Accordingly, when pressurized fluid is directed to the base end of the hydraulic lift cylinder 38 while the piston end thereof is vented, the piston rod is moved vertically downwardly resulting in the carriage 28 being moved from the full-line raised position to the phantom-line lowered position shown in FIG. 3. This movement causes the step-platform assembly 18, after it is deployed and assumes the platform configuration, to be moved as a unit from an elevated position to a ground level position, as will be explained hereinafter.

The step-platform assembly 18 includes a pair of subframe sections 46 and 48 that extend between the support assemblies, and it will be noted that although FIGS. 1 through 3 show only the parts located along one side of the step-platform assembly 18 adjacent support assembly 20, identical and corresponding parts are located along the other side of the step-platform assembly 18 and, where disclosed in the drawings, are identified by the same numerals but primed. As seen in FIGS. 1 and 6, the step-platform assembly 18 is in the folded or step-forming position, and the subframe section 48 has its lower edge connected by a pivotal connection 50 to the inboard edge of the subframe section 46 for limited relative pivotal movement about a horizontal axis that is substantially parallel to the longitudinal axis of the motor vehicle 14 and passes through the center of pivotal connection 50.

The subframe section 46 is formed by a pair of parallel side rails 52 and 52', each of which is perpendicular to the longitudinal axis of the vehicle 14 and are interconnected by a rigid plate 54. Similarly, the subframe section 48 is formed by a pair of parallel side rails 56 and 56', which are interconnected at their upper ends by a rigid plate 58, and is disposed adjacent to a vertical back wall 60 formed rigidly with the body of the vehicle 14. In this position, the subframe section 48 is located in a vertical plane adjacent back wall 60 and has its top edges connected by a pivotal connection 62 to a channel member 64 which is rigidly secured to the carriage 28. Thus, the subframe section 48 is mounted to the carriage 28 and is swingable outwardly, together with the subframe section 46, about a horizontal axis passing through the center of the pivotal connection 62.

The rigid plate 58 of the subframe section 48, when in the step-forming position, defines an upper riser portion, the lower edge of which is connected by a pivotal connection 66 to an upper step member 68, the outboard end of which supports a lower riser member 70 in a manner to be described hereinafter. The upper step member 68 and lower riser member 70 are hinged sections of the step-platform assembly 18 that extend between the support assemblies to an extent substantially the same as subframe sections 46 and 48. The outboard portion of the subframe section 46, when in the step-forming position, defines a lower step portion which, together with the portion of subframe section 46 below the upper step member 68, serves as a platform portion when the step-platform assembly 18 is in the horizontal platform configuration shown in FIG. 3.

Figure 4:
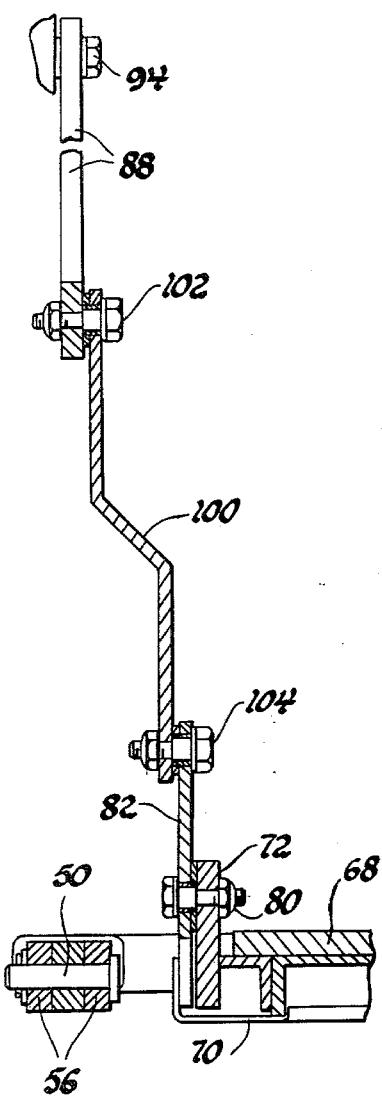
FIG. 4 is a sectional view taken on the line 4—4 of FIG. 3 and shows the bracket which pivotally supports one end of a link and an arm fixed with the lower riser.

The outboard end of the upper step member 68 is rigidly formed with an upstanding bracket 72 which, as seen in FIGS. 1 and 4, is connected by a pivotal connection 74 to the upper end of a support link 76. The lower end of the support link 76 is connected by a pivotal connection 78 to the subframe section 46 intermediate the inboard and outboard ends thereof. The upper end of the lower riser member 70 is also connected to the bracket 72 by a pivotal connection 80 and is rigidly formed with an arm 82 that serves as a crank and extends upwardly above the plane of the upper step member 68 at an angle relative to the plane of the lower riser member 70. It will be noted that the lower edge of the lower riser member 70 is suspended from the bracket 72 and is adapted to pivot about the pivotal connection 80 and be tucked under upper step member 68 and into the cavity 83 formed therein. In this regard and as seen in FIG. 6, the subframe section 48, between the side rails 56 and 56' and below the plate 58, has an opening 84 having a depth and longitudinal length corresponding to the width and longitudinal length of the associated upper step and lower riser members 68 and 70, respectively, so as to allow storage of the latter (as will be explained hereinafter) when the step-platform assembly 18 is deployed to the platform position shown in FIG. 3.

The deployment of the step-platform assembly 18 to the platform position of FIG. 3 is realized through a linkage arrangement carried by the carriage 28. In this regard, it will be noted that the linkage arrangement includes two links—one of which is a double-acting hydraulic cylinder 86 that serves as an extensible and contractible link to deploy the step-platform assembly 18. The other link is a rigid link member 88 which serves to guide the outward movement of the subframe sections 46 and 48, and together with the hydraulic cylinder 86, is carried by the carriage 28. The hydraulic cylinder 86 consists of a cylinder member 89 and a relatively reciprocating piston member 90, with the base portion of the cylinder member 89 being connected to the carriage 28 by a pivotal connection 91. The piston member 90 of the hydraulic cylinder 86 is connected to the subframe section 48 intermediate the upper and lower ends thereof by a pivotal connection 92. The link member 88 has its upper end pivotally connected to the carriage 28 by a pivotal connection 94, while its lower end is connected to the outboard end of the subframe section 46 by a pivotal connection 96 located on a bracket 98 rigid with the subframe section 46. In addition, a link member 100 has one end connected to the link member 88, intermediate the ends thereof, by a pivotal connection 102, while the other end is connected to the arm 82 of the lower riser member 70 by a pivotal connection 104.

From the above description it should be apparent that when the wheelchair lift device 10 has the parts thereof located in the step-forming position of FIG. 1, the upper step member 68 and lower riser member 70 are respectively located in substantially horizontal and vertical positions so as to thereby form the riser and tread portions of one step, while the outboard portion of plate 54 on subframe section 46 forms the tread portion of another step, and the plate 58 defines an upper riser portion. Thus, an able-bodied person can board the vehicle 14 by first stepping on the lower step portion at the outer end of the subframe section 46, then on the upper step member 68, and finally on the floor 16 of the vehicle 14. However, if a physically handicapped person in a wheelchair should wish to gain entrance into the vehicle 14, the vehicle operator will then actuate a control valve of a suitable hydraulic control system (not shown) that will direct pressurized fluid to the piston rod-end of the hydraulic cylinder 86 while venting the base-end of the cylinder member 89. This causes contraction of the hydraulic cylinder 86 by having the piston member 90 drawn into the cylinder member 89 with resultant pivoting of the subframe section 48 in a clockwise direction about the pivotal connection 62. As the subframe section 48 rotates in this manner, it carries the subframe section 46 upwardly and outwardly relative to the stepwell 12 about the same pivotal connection 62 under the control of the link member 88 which pivots in a clockwise direction about the pivotal connection 94. At the same time, the support link 76 pivots in a clockwise direction about the pivotal connection 78 causing the upper step member 68 to fold downwardly about the pivotal connection 66 while the link member 100, acting through the arm 82, causes the lower riser member 70 to pivot rearwardly counterclockwise about its pivotal connection 80 relative to the bracket 72. This can be more clearly seen in FIG. 2 wherein the step-platform assembly 18 is shown partially deployed. As the hydraulic cylinder 86 continues to contract, the link member 88 continues to guide the subframe sections 46 and 48 as they rotate upwardly until they are horizontally aligned with the floor 16 of the vehicle 14 and assume the platform position seen in FIG. 3. At this point, the upper step member 68 is folded into the subframe section 48 and the lower riser member 70 assumes the stored position beneath the upper step member 68, with both the upper step member 68 and lower riser member 70 located in the opening 84 in subframe section 48. Thus, when the step-platform assembly 18 is fully deployed, as seen in FIG. 3., a horizontal platform is formed that is comprised of the two plates 54 and 58 attached to subframe sections 46 and 48, respectively, and the upper step member 68.

In order to ensure proper alignment of the subframe sections 46 and 48 when they are in the deployed or platform position of FIG. 3, stop tabs can be provided on the subframe sections 46 and 48 adjacent the pivotal connection, as seen in the above-mentioned U.S. Pat. No. 4,124,097 Hawks et al., or the hydraulic cylinder 86 can be sized so that upon complete contraction, the subframe sections 46 and 48 are horizontally aligned.

After the step-platform assembly 18 is in the fully deployed position of FIG. 3, the vehicle operator, through appropriate movement of the aforementioned control valve, will cause the base-end of the hydraulic lift cylinder 38 to be pressurized while the piston rod-end thereof is vented. As a result, the piston rod of the hydraulic lift cylinder 38 moves out of the associated cylinder member 39 and causes the carriage 28 to move downwardly along guide-bar 22 and at the same time lowers the step-platform assembly 18 from the elevated position of FIG. 3 to the ground level position shown in phantom lines. The wheelchair can then be rolled onto the formed platform and locked into a stationary position. The vehicle operator then reverses the operation of the hydraulic lift cylinder 38, causing the piston rod-end of the hydraulic lift cylinder 38 to receive pressurized fluid and the base-end thereof to be vented so that contraction of the hydraulic lift cylinder 38 occurs, resulting in the carriage 28 and the step-platform assembly 18 to be returned to the FIG. 2 position wherein the step-platform assembly 18 is once again horizontally aligned with the floor 16. The wheelchair is then unlocked and rolled onto the floor 16 after which pressurized fluid is directed to the base-end of the hydraulic cylinder 86 causing the subframe sections 46 and 48 to be rotated in a counterclockwise direction about the pivotal connection 62 so as to return the various parts of the step-platform assembly 18 to the position of FIG. 1 wherein the steps are formed for normal usage.

Various changes and modifications can be made in this construction without departing from the spirit of the invention. Such changes and modifications are contemplated by the inventor and he does not wish to be limited except by the scope of the appended claims.

The embodiments of the invention for which an exclusive property or privilege is claimed are defined as follows:

1. A wheelchair lift unit of the type having a swingable subframe section carried for rotation about a horizontal axis at its top edge and a horizontal subframe section carried for guided horizontal orbiting movement and linked to the lower edge of said swingable subframe section at its inboard edge for relative movement about a horizontal axis, and wherein the swingable subframe section when in a pendulous vertical position defines an upper riser portion and locates the unit in step configuration and when in its horizontal position locates the unit in platform configuration, the outboard edge of the horizontal subframe section being held horizontal by a guide link supported for pivotal movement about a horizontal axis at its upper end and pivoted to the horizontal subframe section at its lower end whereby the horizontal subframe section defines both a lower step portion and a platform portion; the improvement comprising:

an upper step member hinged at its inboard end to the upper riser portion of the swingable subframe section for rotation about a horizontal axis;

a lower riser member hinged to the outboard end of the upper step member;

a support link connected to the upper step member and to the horizontal subframe section whereby as the swingable subframe section is shifted from a vertical to a horizontal position the upper step member folds down into horizontal alignment with the swingable subframe section and completes the platform in conjunction with the swingable and horizontal subframe sections; and crank means attached to the lower riser member and connected to said guide link so as to tuck the lower riser member backwardly and underneath the upper step member when the swingable subframe section swings to the horizontal position.

2. A wheelchair lift unit of the type having a swingable subframe section carried for rotation about a horizontal axis at its top edge and a horizontal subframe section carried for guided horizontal orbiting movement and linked to the lower edge of said swingable subframe section at its inboard edge for relative movement about a horizontal axis, and wherein the swingable subframe section when in a pendulous vertical position defines an upper riser portion and locates the unit in step configuration and when in its horizontal position locates the unit in platform configuration, the outboard edge of the horizontal subframe section being held horizontal by a guide link supported for pivotal movement about a horizontal axis at its upper end and pivoted to the outboard edge of the horizontal subframe section at its lower end whereby the horizontal subframe section defines both a lower step portion and a platform portion; the improvement comprising:

an upper step member hinged at its inboard end to the upper riser portion of the swingable subframe section for rotation about a horizontal axis;

a lower riser member hinged to the outboard end of the upper step member for rotation about a horizontal axis;

a support link pivotally connected at one end to the upper step member and pivotally connected at the other end to the horizontal subframe section whereby as the swingable subframe section is shifted from a vertical to a horizontal position the support link causes the upper step member to fold down into horizontal alignment with the swingable subframe section and completes the platform in conjunction with the swingable and horizontal subframe sections;

crank means attached to the lower riser member and extending above the plane of the upper step member; and means connecting the crank means to said guide link so as to tuck the lower riser member backwardly and underneath the upper step member when the swingable subframe section swings to the horizontal position.

3. A wheelchair lift device having a step-platform assembly located in the doorway of a vehicle that is convertible from a step-forming position to a platform position to form a horizontal platform and including a pair of support members secured to the vehicle along the opposite sides of the doorway for supporting a carriage for movement from a raised position wherein the platform is in horizontal alignment with an elevated floor formed with the vehicle to a lowered position wherein the horizontal platform is at ground level, said step-platform assembly when in the step-forming position including a vertically disposed first subframe section pivoted at its upper end to the carriage and pivoted at its lower end to a horizontally oriented second subframe section; an upper step member pivotally connected at its inboard end to said first subframe section; a riser member pivotally connected to the outboard end of said upper step member and supported by the latter in a pendulous fashion; means connected to said first subframe section for rotating said first and second subframe sections about the upper end of the first subframe section outwardly relative to the doorway and into said platform position; a guide link connected between said carriage and said second subframe section for guiding said first and second subframe sections into horizontal alignment when rotated into said platform position; a support link connecting the upper step member to said second subframe section and adapted to fold said upper step member into said first subframe section during the outward rotation of said first and second subframe sections; and means connected between said guide link and said riser member for pivoting the latter rearwardly to a position under said upper step member when said first and second subframe sections rotate into platform configuration.

4. A wheelchair lift device having a step-platform assembly located in the doorway of a vehicle that is convertible from a step-forming position to a platform position to form a horizontal platform and including a pair of support members secured to the vehicle along opposite sides of the doorway for supporting a carriage for movement from raised position wherein the platform is in horizontal alignment with an elevated floor formed with the vehicle to a lowered position wherein the horizontal platform is at ground level, said step-platform assembly when in the step-forming position including a vertically disposed first subframe section pivoted at its upper end to the carriage and pivoted at its lower end to a horizontally oriented second subframe section; an upper step member pivotally connected at its inboard end to said first subframe section intermediate the upper and lower ends thereof; a riser member pivotally connected to the outboard end of said upper step member and supported by the latter in a pendulous fashion; a hydraulic cylinder mounted at one end to said carriage and connected at the other end to said first subframe section for rotating said first and second subframe sections about the upper end of said first subframe section and into said platform position; a first link pivotally connected between said carriage and an outboard portion of said second subframe section for guiding said first and second subframe sections into horizontal alignment when rotated into said platform position; a second link connecting said upper step member to said second subframe section for folding said upper step member into said first subframe section during the outward rotation of said first and second subframe sections; and a third link connected between said first link and said riser member for pivoting the latter rearwardly to a position under said upper step member when said first and second subframe sections rotate into platform configuration.

* * * * *